United States Patent Office 3,010,921
Patented Nov. 28, 1961

3,010,921
POLYGLYCIDYL ETHERS
Sylvan Owen Greenlee, 343 Laurel Drive,
West Lafayette, Ind.
No Drawing. Filed May 4, 1960, Ser. No. 26,719
19 Claims. (Cl. 260—18)

This invention relates to novel glycidyl ethers and to conversion products thereof. More particularly the invention relates to glycidyl ethers of hydroxyphenylated unsaturated oils and to conversion products of such glycidyl ethers.

It is well known that valuable, infusible, insoluble materials may be prepared from properly formulated polyepoxide conversion products, however, in many cases these commercial products fall short of possessing the desired amount of flexibility coupled with a high level of hydrophobic character required to give good resistance to aqueous and other highly polar chemical systems. The weakness, for example to boiling water and water solutions, is often exhibited by protective coatings prepared from the reaction of commercial polyepoxide resins with polyamines containing active hydrogen directly attached to nitrogen or with the widely used amino-amides such as the commercial products known as Versamids which are reaction products of long-chain polymerized vegetable oil acids and aliphatic polyamines. Such systems which convert to infusible, insoluble materials through the reaction of an epoxide group with an active hydrogen directly attached to a nitrogen of an amide or amine group give amide or amine linkages in the tridimensional polymer resulting from the conversion reaction. It is well known that the carbon nitrogen linkages forming a part of the polymeric structure of these conversion products is one of the more hydrophilic linkages and in order to give satisfactory results to aqueous systems the overall polymers must possess sufficient hydrophobic portions to more than neutralize the hydrophilic character of the carbon nitrogen linkages. It is generally known in the art that in order to prevent deterioration of protective coatings and plastic objects in general which are to be exposed to the atmosphere the plastic system must be of such hydrophobic character that water is not absorbed by the polymeric structure through attraction of one of the chemical linkages. It is sometimes possible to attain the desired hydrophobic character of a conversion system by simply building up extremely high molecular weights although this method is not always applicable. The other method is that of building into the overall polymeric structure sufficient hydrophobic material to repel attraction of water molecules by the polar linkages used in polymerizing this system to the insoluble, infusible state. If molecules of water can make appreciable contact with polar linkages in the conversion system the water then acts as a solvent for many elements of deterioration such as oxygen, alkali, acids and salts which will in time destroy the organic materials. On the other hand if the overall polymeric structure is of such hydrophobic character that water cannot make contact with the polar groups regardless of how sensitive these groups might be to reaction with water or the other elements which would be solubilized by water deterioration of the organic material does not occur.

One of the desirable means of introducing hydrophobic character to the conversion systems would be that of introducing structures high in hydrocarbon content which contain relatively few polar linkages in the nature of noncarbon linkages. It is, however, often difficult to find means of introducing large portions of hydrocarbon structures into the conversion system due to the lack of proper functionality being present in the hydrocarbon material. Another difficulty encountered in introducing the hydrophobic type hydrocarbon material into such conversion systems as the polyepoxide conversion systems is that of obtaining proper miscibility of all ingredients with each other.

Most commercial polyepoxide resins as typified by the epichlorohydrin dihydric phenol reaction products are limited in their flexibility. In commercial practice this shortcoming in flexibility has been partially overcome by several means which have involved in most cases the addition of a plasticizing material which either did not chemically combine into the final conversion system or in combining into the final conversion system it used some of the epoxide functionality thereby reducing the overall capacity of the polyepoxide to polymerize to the maximum degree. Flexibilizers which have been used to modify the commercial polyepoxide systems which do not enter into chemical union with the system are illustrated by such materials as dibutyl phthalate and highly chlorinated turphenyl compositions. Widely used flexibilizers for polyepoxide systems which chemically unite to the system but do not contribute to the maximum degree of polymerization include the monoepoxides such as butyl glycidyl ether, allyl glycidyl ether, octylene oxide, dodecene oxide, limonene oxide, and phenyl glycidyl ether. In a conversion system, for example, involving the reaction of a diepoxide with a polyamine such as diethylene triamine such monoepoxides would combine with a portion of the amino hydrogen through mono-functional reactions acting essentially as "chain stoppers" in the overall polymerization.

The amino-amides prepared from dimerized and trimerized vegetable oil acids in reaction with polyamines such as diethylene triamine are used as flexibilizing converting agents for commercial polyepoxides. These amino-amides act as the coupling reactant in conversion of the polyepoxides through reaction of the amino hydrogen with epoxide groups and therefore have the limitation as flexibilizers in that they can not be used with other types of converting systems such as, for example, in the conversion of polyepoxides with the anhydrides of polybasic acids. Another flexibilizer which has been used in improving the flexibility of epoxide conversion systems is the linear polymeric polysulfides—commercial examples of which are the Thiokol resins. In using the Thiokol type flexibilizers it is necessary to use other coupling reactants or catalysts in order to realize satisfactory conversion of a polyepoxide as these polysulfides do not have sufficient reactivity with the polyepoxide to accomplish the desired degree of cross-linking polymerization. Another group of flexibilizers which have been suggested for the polyepoxide conversion systems are the epoxidized vegetable oils which are themselves polyepoxides. However, the epoxide groups in these compositions are of such low order of activity in comparison to the usual glycidyl ethers that they do not participate appreciably in many of the conversion reactions. These epoxidized vegetable oil products have, however, been found to possess very limited miscibility with the commercial resinous polyepoxides which are for the most part the glycidyl ethers of dihydric phenols.

A highly desirable polyepoxide would then be one containing (1) a high portion of its structure as hydrocarbon material so as to contribute hydrophobic character, (2) long chain aliphatic structure which would contribute to flexibility of the conversion products, (3) polyfunctionality of the glycidyl ether type and (4) good miscibility with a wide range of plastic formulating materials varying from the highly polar materials such as the commercial polyepoxides composed of the glycidyl ethers of dihydric phenols and phenol formaldehyde condensates (novolacs) to the pure hydrocarbon material such as the aromatic and aliphatic hydrocarbon solvents and such widely used formulating materials as the coal tar and asphalt pitches.

An effective means of accomplishing the desired hydrophobic character, flexibilizing character, wide range of miscibility with plastic formulating materials and polyglycidyl ether functionality would be that of chemically combining glycidyl ether functionality into the chemical structure of the commercially abundant unsaturated vegetable and fish oil derivatives. The introduction of the glycidyl ether functionality into the unsaturated oil structures would desirably and necessarily require sufficient modifications so as to give the desired wide range of miscibility with other formulating materials and contribute the desired degree of glycidyl ether functionality to incorporate into the material thermoset character through catalytic polymerization or through reaction with other ingredients to be used in conjunction therewith in formulating the final conversion system.

For purposes of discussion within this disclosure the terms unsaturated oil materials or oil materials will be used to cover materials of the unsaturated vegetable and fish oil type based on derivatives of C–12 to C–22 carbon unsaturated acids and C–12 to C–22 carbon unsaturated alcohols.

It is therefore a principal object of this invention to provide modified unsaturated oil materials which can be thermoset.

It is more specifically a primary object of the invention to provide modified unsaturated oil materials which readily react with cross-linking agents, thermosetting resins or which self-polymerize to form infusible, insoluble products.

It is an additional object of the invention to provide modified unsaturated oil materials which are readily soluble in commercially available hydrocarbon solvents and which may be thermoset by reaction with cross-linking reactants or polymerization catalysts.

It is also an object of the invention to provide modified unsaturated oil materials which are readily soluble in the commercial polyepoxide resins and which may be thermoset by reaction of the homogeneous mixture with the commercial polyepoxide resins with cross linking reactants or polymerization catalysts.

Another object of the invention is to provide polyglycidyl ethers which on reaction with cross linking reactants or polymerization catalysts thermoset to highly flexible, insoluble, infusible materials.

Another object of the invention is to provide polyglycidyl ethers which are readily soluble in commercially available coal tar and asphalt pitches and react in mixtures therewith with cross linking reactants or polymerization catalyst with or without the application of heat, to effect a marked elevation of the softening point of the coal tar or asphalt pitch.

Another object of the invention is to provide polyglycidyl ethers which are readily soluble in commercially available coal tar and asphalt pitches and react in mixtures therewith with cross linking reactants or polymerization catalyst with or without the application of heat to give flexible, infusible, insoluble materials.

Still another object of the invention is to provide a polyglycidyl ether which may be thermoset by reaction with cross linking reactants or polymerization catalysts to give flexible, infusible, insoluble materials which are highly resistant to chemicals.

An additional object of the invention is to provide flexible, infusible, insoluble plastic coatings and fabricated objects characterized by high resistance to water alkali, acid, and polar and nonpolar organic and inorganic solvents.

The invention generically contemplates the polyglycidyl ethers of hydroxyphenylated-phenyletherated unsaturated oil materials prepared by alkylating a phenol selected from a group consisting of monohydric and dihydric phenols having at least one unsubstituted ortho or para position on the aromatic nucleus to which a phenolic hydroxyl group is attached.

The invention more generically contemplates the polyglycidyl ethers of hydroxyphenylated-phenyletherated compounds prepared by reacting a phenol with an unsaturated material selected from the group consisting of (1) natural oils which are glycerol esters of unsaturated aliphatic acids having from about 12 to 22 carbon atoms per molecule; (2) synthetic esters of the unsaturated aliphatic acids having from about 12 to 22 carbon atoms per molecule with monohydric and polyhydric alcohols; (3) phenolic esters of the unsaturated aliphatic acids having from about 12 to 22 carbon atoms per molecule; (4) unsaturated aliphatic alcohols containing from about 12 to 22 carbon atoms per molecule; (5) esters of the unsaturated alcohols contemplated by (4) of carboxylic acids, said material prior to reaction with said phenol having an average of at least two double bonds per molecule, said hydroxyphenylated compound having a total phenol addition of at least about 15% by weight, a phenol addition as hydroxyphenyl of at least about 10% by weight, said phenol additions being expressed in equivalents of phenol at unit weight 94, and an average of at least about 2 phenolic hydroxyls per molecule.

Representative unsaturated aliphatic acids having from 12 to 22 carbon atoms per molecule and used in preparing the esters contemplated by the invention are palmitoleic, oleic, isomeric linoleic, isomeric linolenic, licanic, eleostearic, clupanodonic, erucic and arachidonic acids.

Representative natural oils contemplated by the invention include cod liver, corn, cottonseed, herring, kapok, lark, linseed, menhaden, mustard, neat's-foot, oiticica, olive, palm, peanut, perilla, poppyseed, rapeseed, rice bran, safflower, salmon, sardine, sesame, shark-liver, soyabean, sunflower, tall, tung and whale oils.

The invention in its generic scope contemplates all of the various aliphatic monohydric and polyhydric alcohol esters of the unsaturated aliphatic acids having from about 12 to 22 carbon atoms per molecule. It is the intention of this disclosure to include each of the various species of alcohols falling within the scope of the foregoing generic definition inasmuch as the specified unsaturation of the ester molecule, rather than the specific alcohol from which the ester is derived, is the essential feature upon which utility of the esters in the invention depends. The preferred alcohols contain from about 1 to about 22 carbon atoms. Representative alcohols are methanol, ethanol, 1-propanol, 1-butanol, 1-pentanol, 1-hexanol, 1-octanol, 1-nonanol, 1-decanol, 1-hendecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-heneicosanol, 1-docosanol, and the various isomers and unsaturated analogues thereof.

Representative polyhydric alcohols used in preparing the synthetic esters are ethylene, propylene and butylene glycols; glycerol; pentaerythritol; polypentaerythritols; mannitol; sorbitol; polymeric polyhydric alcohols such as those derived from the reaction of epichlorohydrin with bis (4-hydroxyphenyl) dimethyl methane (U.S. Patent 2,456,408); the polymers of allyl alcohol; and the copolymers of allyl alcohol with vinyl monomers such as styrene.

The synthetic esters of unsaturated aliphatic acids embraced by this invention also include the mixed esters of polyhydric alcohols in which one of the acids is an unsaturated aliphatic acid having from about 12 to 22 carbon atoms per molecule. Illustrative of valuable mixed esters used in preparing the hydroxyphenylated compositions are the unsaturated alkyd resins based on the esterification of polyhydric alcohols with mixtures of polybasic acids or their anhydrides such as phthalic anhydride and unsaturated aliphatic acids such as soya bean oil acids.

The invention likewise generically embraces all phenolic esters of the unsaturated aliphatic acids having from about 12 to 22 carbon atoms per molecule. More particularly, the invention contemplates without limitation all of the various esters of such acids with all of the various monohydric, dihydric and trihydric phenols. Representative esters are derived from the various alkyl phenols such as phenol; ortho-, meta-, and para-cresol; ortho-, meta-, and para-ethyl phenol; ortho-, meta-, and para-propyl and isopropyl phenol; ortho-, meta-, and para-n-butyl, isobutyl and t-butyl phenol; ortho-, meta-, and para-phenyl phenol; xylenol; resorcinol; and the various naphthols such as alpha- and beta-naphthol.

The invention embraces without limitation all unsaturated aliphatic alcohols containing at least two double bonds per molecule and from about 12 to about 22 carbon atoms per molecule as starting materials for the production of hydroxyphenylated compounds. Preferred alcohols are prepared by the selective catalytic reduction of the various vegetable oils, which are glycerides of 12 to 22 carbon atom unsaturated fatty acids. Typical unsaturated alcohols are those obtained by converting to alcohol groups the carboxyl groups of isomeric linoleic, eleostearic, erucic, arachidonic and clupanodonic acids and converting both the carboxyl and ketone groups of licanic acid to alcohol groups using selective hydrogenation methods which leave the olefin group unaffected.

The invention further contemplates hydroxyphenylated compounds produced from esters of the foregoing unsaturated alcohols with all of the various aliphatic and aromatic mono- and poly-carboxylic acids. It should be noted that 12–22 carbon mono-olefinic alcohols when esterified with polybasic acids contain at least two olefin groups per molecule and are useful in preparing hydroxyphenylated oil derivatives which fall within the scope of this invention. It is the intention of the disclosure to embrace individually esters derived for each of such acids, and preferably those acids which contain from about 1 to about 20 carbon atoms. Representative acids include formic acid, acetic acid, the various isomeric propionic acids, butyric acids, pentanoic acids, hexanoic acids, octanoic acids and the like, together with the unsaturated analogues thereof. Representative aliphatic polybasic acids include itaconic acid, succinic acid, maleic acid, tartaric acid and the like. It will be appreciated that the functional characteristic of the esters contemplated resides in the presence in the ester molecule of two or more olefinic double bonds. Hence, the specific acids and alcohols from which the esters are derived do not constitute the essence of the invention, which contemplates hydroxyphenylated derivatives of each of the esters embraced by the foregoing generic definition.

The hydroxyphenylated derivatives of such unsaturated oil materials are appropriately prepared by the alkylation of mono and dihydric phenols by reaction with the olefin groups present in the unsaturated oil materials. Convenient catalysts for the preparation of the phenol addition products of the unsaturated oil materials were found to include boron trifluoride and aluminum chloride. In using BF$_3$ it was found to be convenient to carry out the reaction of the unsaturated oil material with phenol in the temperature range of 25 to 250° C. The temperature and reaction time vary with the particular combination of phenol and unsaturated oil material used as well as the final properties desired in the final glycidyl ether product. It has been found that catalytic addition of phenol to the unsaturated oil materials results in a mixture of hydroxyphenylation and phenyletheration of the double bonds so that a mixed product results. Such mixed hydroxyphenylated-phenyletherated unsaturated compounds have proven to given polyglycidyl ethers having excellent miscibility with commercial polyepoxides and with hydrocarbon materials including the hydrocarbon solvents and coal tar and asphalt pitches. It appears likely that the phenyletheration which takes place in conjunction with the hydroxyphenylation is an important factor in contributing the highly desirable physical and chemical characteristics to the final polyglycidyl ethers.

The phenol addition products of the unsaturated oil materials particularly useful in preparing the glycidyl ethers of the invention are characterized by total phenol addition of at least about 15% by weight, a phenol addition as hydroxyphenyl of at least about 10% by weight said phenol addition being expressed in equivalents of phenol at unit weight 94 and an average of about 2 phenolic hydroxyls per molecule.

In order to supplement the unsaturated oil materials available in experimental or commercial quantities from their manufacturers two special esters were prepared and are described as Examples A and B.

*Example A.—Tall oil acid ester of bis-(4-hydroxyphenyl) dimethyl methane, known commercially as Bis-Phenol A (BPA)*

In a 5 liter 3-neck flask provided with a thermometer, a mechanical stirrer and a reflux condenser was placed 1130 grams of BPA and 1122 grams of acetic anhydride. This mixture was heated at reflux with continuous agitation for a period of one hour, the temperature ranging from 134–143° C. At this point 2240 grams of Aconew-Extra tall oil acids (Heyden-Newport Chemical Corporation) were added to the reaction mixture and the regular reflux condenser was replaced with a Dean-Stark reflux condenser. The Aconew-Extra tall oil acids have an acids value of 194, an iodine value of 130, a rosin acid content of 1% and a fatty acid content of 98% composed of 45% linoleic acid, 54% oleic acid and 1% saturated acids. Heating was continued allowing the excess acetic anhydride and acetic acid to distill into the Dean-Stark trap where it was recovered. When the temperature of the reaction mixture reached 200° C. a slow stream of carbon dioxide was passed through. The constantly agitated reaction mixture was heated at a temperature of 240–251° C. for a period of 2 hours and 40 minutes reducing the pressure by use of a water pump during the last hour of this heating period finally reducing the pressure with a vacuum pump to 3 mms. of mercury during the last few minutes. The resulting ester had an acid value of 1, a viscosity of J (Gardner bubble viscometer) and a color of 7 (Gardner-Hellige).

*Example B.—The adipate of unsaturated 18 carbon alcohols*

By the same procedure used in preparing the ester of Example A a mixture of 243 grams adipic acid and 933 grams Unadol 90 (available from Archer Daniels Midland Company and having an acid value of 3, an iodine value of 173 and 6.33% hydroxyl) was esterified at 240–250° C. to give a product having an acid value of 7.4, a viscosity of D and a color of 11.

The procedure which was used in preparing the phenol addition products of the unsaturated oil materials using BF$_3$ catalyst as reported in Table I is given as follows.

Into a 3-neck flask provided with a thermometer, a mechanical agitator, a one liter dropping funnel, an electrical heating mantle (and a pan of tap water on hand to be used for cooling the reaction if necessary) is placed the phenol and the BF$_3$·ether catalyst. The mixture is raised to the indicated reaction temperature and addition of the unsaturated oil material is begun. The addition of the oil materials is at such rate that the temperature does not rise above the desired reaction temperature from exothermic reaction heat. This addition is normally carried out over a period of 10–30 minutes applying heat if necessary or cooling the flask externally with a pan of tap water if required to hold the reaction temperature. At the end of the reaction period the temperature is lowered to 90° C., in cases where the reaction temperature is above this temperature, and xylene or toluene added in an amount approximately equal in weight to the unsaturated oil and phenol added (if solvent was used in reaction it becomes a part of the specified amount of solvent). Hot tap water in an amount 25 to 50% by weight of the total solvent solution is added. With continuous agitation the mixture is heated at 80° C. for 10–15 minutes and allowed to separate into water and organic layers. In case layering is not satisfactory because of emulsification, 20 to 50 ml. acetic acid is added to the wash. The water layer is removed and the washing with 80° C. tap water repeated two more times. The flask is then provided with a salt-ice bath cooled receiver and the mixture heated with rapid agitation until the pot temperature reaches 150–160° C. at which point the pressure is reduced to 15–20 mms. of mercury by using a water pump. The batch is held about 15 minutes at this pressure keeping the pot temperature at 150–200° C. The hydroxyphenylated unsaturated oil materials are relatively low melting, ranging from liquid to low melting solids; however, the pot temperature in vacuum stripping these materials is conveniently held at about 150° C. or higher in order to efficiently remove the unreacted phenol. The receiving flask is then connected to a vacuum pump and the pressure reduced to 1 to 5 mms. of mercury holding this pressure for 10–15 minutes, holding the pot temperature of the constantly agitated product at a temperature estimated to be 50° C. above the softening point. The product is poured into a suitable container and allowed to cool.

In the examples reported in Table I the percent by weight of added phenol is the weight of recovered product minus the weight of unsaturated oil material used divided by the weight of the recovered product.

The hydroxyl content was determined by reaction with acetyl chloride and titrating with alkali. An acetyl chloride-toluene solution was prepared by mixing 1.5 mols acetyl chloride with dry toluene to make 1 liter of solution. In a 250 ml. iodine flask was pipetted 10 ml. of the acetyl chloride-toluene reagent and the flask chilled in ice water followed by the addition of 2 ml. of pyridine. The flask was tightly stoppered and shaken to form a paste. The sample was added as a 50% solution in toluene in such quantity that there remained in excess 0.5 mol of acetyl chloride for each mol reacted. The flask was gently heated for 20 minutes in a water bath held at about 60° C. When first placing the flask into the bath, the stopper should be momentarily removed to expel any pressure and then reseated firmly. During the heating period the flask should be shaken several times. After removing the flask from the bath, it was chilled in ice water. Subsequently 25 ml. of distilled water were added and shaken well. A few drops of phenolphthalein indicator were added and titration was carried out with 0.5 N methanolic KOH. A blank was run in a similar manner. Corrections were made for any free acidity of the sample and any alcoholic hydroxyl content of the basic polyene used in preparation of the hydroxyphenylated composition.

Table I entitled "Unsaturated Oil-Phenol Addition Products" describes Examples 1 through 9 illustrating the reaction of phenols with the unsaturated oil materials to give the hydroxyphenylated-phenyletherated intermediates used in preparing the new polyglycidyl ethers of this invention.

Some abbreviations used in Table I are L. O. for linseed oil, C.W.O. for China-wood oil, S.O. for soya bean oil, Corn O. for corn oil and Selexol F.O. a special fish oil obtained from J. Howard Smith, Inc. and having an iodine value of 220.

Calculation of the percent hydroxylphenyl (—$\phi$OH) content from the percent hydroxyl and the percent total phenol addition from the grams of product will show that there is appreciable phenyl ether ($\phi$O—) formation along with the hydroxyphenylation in many cases, although resorcinol often tends to form almost exclusively hydroxyphenylation.

The polyglycidyl ethers of the invention are prepared by reacting the hydroxyphenylated-phenyletherated unsaturated oil materials with a halohydrin selected from the group consisting of epichlorohydrin, epibromohydrin, glycerol dichlorohydrin and glycerol dibromohydrin in the manner well known to the art for the production of glycidyl ethers as described, for example, in U.S. Patents 2,801,227 and 2,467,171. In general, the polyglycidyl ethers of the invention may appropriately be prepared by the addition of hydroxyphenylated-phenyletherated unsaturated oil materials to the halohydrin utilized in an excess of greater than one mol of halohydrin per equivalent weight of phenolic hydroxyl group present in the unsaturated oil material reactant and thereafter adding an alkali metal hydroxide such as sodium or potassium hydroxide to the mixture to effect the desired etherification reaction. It is convenient to dissolve the hydroxyphenylated-phenyletherated unsaturated oil material in the stoichiometric excess of halohydrin, and to utilize a supplemental solvent, such as xylene or toluene if necessary, to afford the proper viscosity in the reaction mixture. The mixture of the hydroxyphenylated material and halohydrin is preferably heated to a temperature in the range of about 100–120° C. Aqueous alkali metal hydroxide of a concentration of about 15–50% by weight is thereafter gradually added to the reaction mixture. At temperatures in excess of 100° C. the water added with the hydroxide and formed in the reaction is removed by distillation azeotropically with halohydrin. The condensed azeotrope separates into an aqueous phase and the halohydrin or halohydrin-organic phase is returned to the reaction mixture.

The sodium hydroxide is utilized in an amount preferably to about 0.1 to about 5% in excess of the stoichiometric quantity of phenolic hydroxyl group present. Alternatively, the alkali metal hydroxide may be added as an alcohol solution.

It is particularly important that the glycidyl ether formation from the hydroxyphenylated unsaturated oil materials be conducted under essentially anhydrous conditions, so as to prevent reaction of the alkali with the ester groups. The reaction in which the water is continuously removed during the reaction period and the

TABLE I.—UNSATURATED OIL-PHENOL ADDITION PRODUCTS

| Ex. No. | Grams Phenol | Grams Unsaturated Oil | Catalyst | Hours @ ° C. | Grams Product | Percent Weight as OH | Softening Point [1] or Viscosity |
|---|---|---|---|---|---|---|---|
| 1 | 220 Resorcinol | 293 L.O. | 10 ml. BF$_3$.ether | 2.5 @ 100–105 | 418 | 9.02 | 86° C. |
| 2 | 1,880 Phenol | 200 C.W.O. | 50 ml. BF$_3$.ether | 5.75 @ 100–105 | 343 | 5.45 | Z4–Z5 @ 80% in Xylene. |
| 3 | 1,000 Phenol | 300 Selexol F.O. | 35 ml. BF$_3$.ether | 6 @ 100–105 | 477 | 4.93 | Z2 @ 80% in Xylene. |
| 4 | 660 Resorcinol | 500 Selexol F.O. | 40 ml. BF$_3$.ether | 3 @ 100–105 | 783 | 10.1 | 96° C. |
| 5 | 330 Resorcinol | 290 S.O. | 15 ml. BF$_3$.ether | 2.5 @ 100–105 | 408 | 7.83 | 59° C. |
| 6 | 1,140 o-Cresol | 300 Selexol F.O. | 35 ml. BF$_3$.ether | 6 @ 100–105 | 494 | 3.73 | Z2 at 80% in Xylene. |
| 7 | 495 Resorcinol | 636 Corn O. | 35 ml. BF$_3$.ether | 2.5 @ 100–105 | 878 | 7.34 | 55° C. |
| 8 | 165 Resorcinol | 300 Example A | 10 ml. BF$_3$.ether | 2 @ 120–125 | 349 | 5.92 | Z1 at 80% in Xylene. |
| 9 | 110 Resorcinol | 300 Example B | 10 ml. BF$_3$.ether | 2 @ 120–125 | 368 | 5.32 | Z6 at 80% in Xylene. |

[1] Durran's Mercury Method, Journal of Oil & Color Chemists' Association, 12, 173–175 (1929).

alternate procedure of using alcoholic solutions of the alkali are appropriate means of satisfactorily minimizing reactivity of the alkali with ester groups.

On completion of the etherification reaction, unreacted halohydrin and any solvent present may appropriately be removed by distillation or by other means familiar to the art. The residue or the reaction mixture will consist primarily of the desired polyglycidyl ether of the hydroxyphenylated-phenyletherated unsaturated oil material and alkali halide and is appropriately treated with a solvent such as xylene or toluene to dissolve the polyglycidyl composition. The salt is thereafter removed by filtration and the filtrate stripped of volatile materials under reduced pressure to provide the desired polyglycidyl composition.

Representative examples of polyglycidyl ethers of hydroxyphenylated-phenyletherated unsaturated oil materials contemplated by the invention together with reactants and reaction conditions utilized are reported in Table II entitled "Glycidyl Ethers of Hydroxyphenylated-Phenyletherated Unsaturated Oil Materials." The general procedure utilized in production of the polyglycidyl ethers reported in Table II was as follows.

The indicated hydroxyphenylated-phenyletherated unsaturated oil material, halohydrin, and solvent were combined in a 3-neck flask fitted with a stirrer, condenser, two dropping funnels and a thermometer. The condenser was attached to the flask through a water leg (Dean-Stark) to effect removal of water from the system. Heat was applied to effect solution of the hydroxyphenylated product in the halohydrin. Agitation was initiated as soon as sufficient homogeneity of the hydroxyphenylated product and halohydrin was obtained. The reaction temperature was adjusted to the indicated range. A 40% aqueous solution of sodium hydroxide in an amount equivalent to provide 1.01 mols of sodium hydroxide per equivalent of phenolic hydroxyl group was aded drop-wise with continuous agitation. The water layer as formed in the water leg was discarded and the separated halohydrin layer returned to the reaction mixture.

idyl ether solution. The glycidyl ether solution was then gradually heated to a temperature of about 150° C. under a vacuum of about 15–20 mm. mercury, which was ultimately reduced to 3–5 mm. of mercury, permitting the temperature to reach a maximum of about 160–175° C. maintaining the polyglycidyl ether sufficiently fluid for continuous agitation. The hot, liquid polyglycidyl ether product was then poured from the flask into a cooling pan.

Epoxide contents of the polyglycidyl ethers were measured by heating samples which corresponded to approximately one gram sample per each 400 in equivalent weight with an excess of pyridine containing pyridine hydrochloride (made by ading 16 ml. of concentrated hydrochloric acid per liter of pyridine) at the boiling point for 20 minutes and back titrating the excess pyridine hydrochloride with .1 N KOH using phenolphthalein as indicator and considering that 1 mol of the HCl is equivalent to one epoxide group.

The polyglycidyl ethers of this invention are contemplated to have at least about two glycidyl ether groups per molecule and preferably contain at least about three glycidyl ether groups per molecule. The new polyglycidyl ether products may contain as many as 20 or more glycidyl ether groups depending on the hydroxyphenylated unsaturated oil material used in reaction with the glycidyl ether forming halohydrin.

The glycidyl ether group is known to the art to be exceedingly reactive. As a functional group of the hydroxyphenylated unsaturated oil materials contemplated by this invention, the glycidyl ether group is effected for conversion of such oil materials into thermosetting products with any of the various converting agents known to be useful for the conversion of epoxides. The invention accordingly embraces generically all epoxide-converting agents, including specifically such converting agents as primary and secondary polyamines, organic polybasic acids and their anhydrides, formaldehyde condensates of phenols and urea or melamine derivatives, tertiary amines, polyamides, polymercaptans, polyhydric phenols, Lewis TABLE II.—GLYCIDYL ETHERS OF HYDROXYPHENYLATED-PHENYL-ETHERATED UNSATURATED OIL MATERIALS

| Ex. No. | Grams of Hydroxyphenyl Oil Material | Grams Epichlorohydrin | Mols 40% Aqueous NaOH | Reaction Time in Hours | Reaction Temperature in ° C. | Epoxide Equiv. Wt. |
|---|---|---|---|---|---|---|
| 1a | 188 of Example 1 | 463 | 1.01 | 2.13 | 105–116 | 406 |
| 2a | 112 of Example 2 | 139 | 0.31 | 2.50 | 112–117 | 578 |
| 3a | 172 of Example 3 | 139 | 0.52 | 1.50 | 110–120 | 793 |
| 4a | 168 of Example 4 | 370 | 1.02 | 1.66 | 106–117 | 393 |
| 5a | 109 of Example 5 | 185 | 0.52 | 1.00 | 106–117 | 491 |
| 6a | 228 of Example 6 | 185 | 0.52 | 0.81 | 111–117 | 685 |
| 7a | 232 of Example 7 | 277 | 1.02 | 1.86 | 112–121 | 438 |
| 7b | 116 of Example 7 | 92 | 0.52 | 1.00 | 110–120 | 685 |
| 8a | 260 of Example 8 | 222 | 0.81 | 1.25 | 112–119 | 849 |

The rate of addition of sodium hydroxide was contemplated to preclude the exothermic reaction from reaching a temperature in excess of that indicated in Table II. Sodium hydroxide addition normally required a period of 0.5 to about 2.5 hours. On completion of the sodium hydroxide addition, heating of the reaction mixture was continued for the remainder of the reaction time indicated in Table II.

Thereafter the condenser was adjusted for distillation and the reaction mixture was heated and stirred until the temperature reached about 150° C., at which time the pressure was gradually reduced to about 15–20 mm. of mercury by a water pump, thereby permitting the temperature to reach a maximum of 160° C. At this point the reaction mixture was allowed to cool to about 120° C. and treated with xylene in an amount corresponding to about 2 to 3 times the weight of the hydroxyphenylated product utilized. After thorough agitation, the reaction mixture was filtered to remove the insoluble sodium chloride. The separated sodium chloride was washed with solvent, and the washings were combined with the glycacids including $BF_3$ and the mineral acids, alkali phenoxides and polyhydrazides. More particularly, the glycidyl ethers of the invention may be converted to thermosetting materials by all of the various active hydrogen containing compounds and by catalysts effective to polymerize epoxide groups.

The hydroxyphenylated - phenyletherated materials which contain an average of at least about 2 phenolic hydroxyl groups per molecule contain active hydrogen and constitute an excellent class of coupling agents for the glycidyl ethers of this invention. The hydroxyphenylated-phenyletherated materials may be formed by the reaction of a phenol with a material from the group consisting of unsaturated petroleum resins, unsaturated polymers of butadiene and its homologues, unsaturated copolymers of butadiene and its homologues with vinylly unsaturated monomers, natural oils which are glycerol esters of unsaturated aliphatic acids having from about 12 to about 22 carbon atoms per molecule, synthetic esters of unsaturated aliphatic acids having from about 12 to about 22 carbon atoms per molecule with monohydric and dihydric alcohols, phenolic esters of unsaturated aliphatic acids having from about 12 to about 22 carbon atoms per molecule, unsaturated aliphatic alcohols having from about 12 to 22 carbon atoms per molecule, and esters of unsaturated aliphatic alcohols having from about 12 to about 22 carbon atoms per molecule with carboxylic acids. Such materials may be produced in a manner analogous to that described in the copending application S.N. 833,144. The materials which may be hydroxyphenylated are described in detail in copending applications S.N. 16,136; S.N. 16,150; and S.N. 833,144. The average number of phenolic hydroxyl groups per molecule in the hydroxyphenylated material best suited for a given application will depend upon a variety of factors. For example, as the molecular weight of the coupling material increases it generally is advantageous to increase the average number of phenolic hydroxyl groups per molecule. However, since the precise phenolic hydroxyl content of the coupling agent will depend upon the specific application, this invention generally contemplates all of the above hydroxyphenylated materials which contain on the average at least about two phenolic hydroxyl groups per modecule. A catalyst such as a standard tertiary amine catalyst most appropriately is employed in conversion systems which contain these hydroxyphenylated materials.

Another desirable group of coupling agents comprises the amino-amides which are reaction products of polyamines with vegetable and animal oil acids having from about 12 to about 22 carbon atoms per molecule, dimerized vegetable or animal oil acids, or trimerized vegetable or animal oil acids. General Mills, Inc. sells the amino-amides derived from polyalkylene polyamines and dimerized vegetable oil acids under the trade name "Versamids."

The infusible, insoluble coversion product of the curable mixtures of converting agents and glycidyl ethers of the invention may be formulated as solvent solutions to provide valuable coating materials. Alternatively, the glycidyl ethers of the invention may be reacted with converting agents in the essential absence of solvents to provide molded objects.

Useful products are also prepared by the incorporation of reactive and non-reactive materials in the mixtures of the glycidyl ethers of the invention with appropriate coupling agents or catalysts. Representative additional reactive materials include resinous materials such as the formaldehyde condensates of urea, melamine and phenol.

A particularly advantageous modification of the glycidyl ether conversion systems contemplated by the invention embraces mixtures thereof, with coal tars and asphalts which, upon conversion, yield materials useful as underground pipe coatings and in road building. The unique solubility of the new glycidyl ethers in hydrocarbons as compared to the solvency requirements of ketone and ester solvents for commercially known polyepoxide resins makes them very advantageous in formulation in mixtures with these cheap hydrocarbon coal tar and asphalt materials. Small portions as low as 5 to 10% of the total formulation weight as coal tar or asphalt contributes to the flexibility of the converted system. Conversely, incorporation of as low as 5 to 10% of the total formulation weight as the new glycidyl ether with a converting agent gives appreciable elevation of the softening point of the coal tar and asphalt materials. Compositions containing from 10 to 90% of the total weight as coal tar or asphalt are particularly advantageous. U.S. Patent 2,765,288 describes the formulation of some coatings based on mixtures of some commercial epoxides with coal tar pitch. U.S. Patent 2,906,720 describes the formulation of similar coatings based on some commercial polyepoxides and high aromatic content petroleum asphalt. With the new polyglycidyl ethers their solubility in hydrocarbons is such that their use in modifying coal tar and asphalt compositions applies to the complete range of low and high aromatic content pitches. The epoxide conversion systems based on the new glycidyl ethers demonstrate a marked effect of hardening and insolubilizing of tars and asphalts and yield products superior to the analogous products known to the prior art.

Examples 1b through 8b illustrate the capacity of the glycidyl ethers described in Table II as Examples 1a through 8a to form infusible products and to elevate the softening point of such widely used commercial materials as asphalt. Viscosities represented by the examples were determined by a Gardner bubble viscometer. Film hardness was measured with a Sward rocker with the value for a flat glass plate set at 100. GL hardness-adhesion readings are reported as the number of grams weight required to scratch the surface in one case and to completely remove the film from a glass panel in the other case as determined from a Graham-Linton hardness tester. The bend tests were run using a mandrel set manufactured by the Gardner Laboratory, Inc. Wet films 0.003" thick were spread on 30 gauge bright, dry finish coke 3" x 5" tin plates cured by baking as indicated in the examples and bent sharply around a steel rod of the size indicated in the examples.

*Example 1b.*—A mixture of 4 parts of the glycidyl ether of Example 1a and 2 parts of Versamid 115 dissolved in xylene to a nonvolatile content of 56.4% gave a viscosity of Z1. Versamid 115 (available from the Chemical Division of General Mills, Inc.) is an aminoamide prepared by the reaction of a polyethylene polyamine with dimerized vegetable oil acids to give a viscosity of 500–700 poises at 40° C. and an amine value of 210–230. Wet films of 0.003" thickness were baked for ½ hour at 150° C. on tin plate for bend test and on glass plate for chemical resistance test. Similar panels were cured at room temperature in a period of 1 hour at 50° C. and in a period of 5 hours at room temperature (approximately 25° C.). All of the cured films passed the bend test of ⅛". No deterioration was observed on films which had been baked at 150° C. on 24 hour immersion at 100° C. in toluene, methyl isobutyl ketone, water, 50% sulfuric acid, or 10% sodium hydroxide. Products which had been cured at room temperature and permitted to stand for a period of 5 days showed no deterioration on immersion for 5 hours at 100° C. in methyl isobutyl ketone, mineral spirits and water. The films which had been cured at 150° C. had a rocker hardness value of 18, a GL scratch value of 700 and a GL removal value of 800.

The 1b varnish was blended with asphalt cement (120/150 penetration asphalt obtained from Socony Mobil Oil Company) in portions to give percentages of the nonvolatile content as asphalt of 25, 50, and 75, Satisfactory conversion to infusible, inflexible films using 25% of the nonvolatile content as asphalt resulted from submitting 0.003" wet films to .5 hour heating at 150° C. or standing at room temperature overnight. The products containing 50 and 75% of the total nonvolatile content as asphalt readily set to solids which would not flow on the application of heat, however, they contained slight tack. The slight tack condition of these asphalt films, however, would not be detrimental in their application in hardening asphalt to be used as a binder in road structure, for example. In such an application it is the usual practice to use about 5 to 10% of the total weight as the organic binder which in this case would be the asphalt modified 1b composition and 95–90% of the total weight as rock aggregate.

*Example 1c.*—A mixture of four parts of the glycidyl ether of Example 1a and 1.5 parts of phthalic anhydride was fused to a homogeneous product and then heated for .5 hour at 150° C. to give an infusible object which possessed unusually high flexibility and readily machined without signs of showing hot tack.

*Example 2b.*—A mixture of 6 parts of the glycidyl ether of Example 2a and 2 parts of Versamid 115 dissolved in xylene to give a nonvolatile content of 69.5% had a viscosity of Y. Films of 0.003" wet thickness were converted to flexible, infusible, insoluble films by heating for .5 hour at 150° C. and also by heating 8 hours at 50° C. Satisfactory conversion of these films was also observed when they were permitted to stand at room temperature overnight. In all cases the films passed the 1/8" bend test. The films cured at 150° C. had a rocker hardness of 18 and showed no signs of deterioration on 24 hour immersion at 100 C. in toluene, dimethylformamide, mineral spirits, water, 50% aqueous sulfuric acid and 10% aqueous sodium hydroxide.

*Example 2c.*—A mixture of 10 parts of the glycidyl ether of Example 2a, 8 parts of a trimerized vegetable oil acid and .6 part of tris(dimethylamino) phenol dissolved in xylene to 65% nonvolatile content gave a viscosity of K. Highly flexible, infusible, insoluble films were obtained by subjecting films of 0.003" wet thickness to baking for 1/2 hour at 175° C.

*Example 3b.*—A mixture of 8 parts of the glycidyl ether of Example 3a and 1 part of maleic anhydride was fused to a homogeneous product and then heated for .5 hour at 150° C. to give a very flexible infusible object which showed no tackiness at the baking temperature or on subjection to machining.

*Example 4b.*—A mixture of 4 parts of the glycidyl ether of Example 4a and 2 parts of Versamid 115 dissolved in xylene to a 47% nonvolatile content gave a viscosity of V. Films of 0.003" wet thickness gave conversion to highly flexible, infusible materials on heating for .5 hour at 150° C., for 1 hour at 50° C., or on standing overnight at room temperature. All of the cured films passed 1/8" bend. The material baked at 150° C. had a rocker hardness of 30, a GL scratch of 600 and a GL removal value of 700; and on immersion for 24 hours at 100° C. in toluene, mineral spirits, water, 50% aqueous sulfuric acid, and 10% aqueous sodium hydroxide showed no deterioration of the film.

*Example 5b.*—A mixture of 5 parts of the glycidyl ether of Example 5a and 2 parts of Versamid 115 were dissolved in xylene to give a nonvolatile content of 66% having a viscosity of Z3. Films of 0.003" wet thickness showed good conversion to flexible, infusible materials on heating for 1/2 hour at 150° C. or 1 hour at 50° C. The films passed 1/8" bend test. The films cured at 150° C. showed no deterioration on immersion for 24 hours at 100° C. in methyl isobutyl ketone, mineral spirits, water, 50% aqueous sulfuric acid and 10% aqueous sodium hydroxide.

*Example 6b.*—A mixture of 7 parts of the glycidyl ether of Example 6a and 2 parts of Versamid 115 dissolved in xylene to a 67.5% nonvolatile content gave a viscosity of V. Films of 0.003" wet thickness cured to flexible, infusible materials on heating for .5 hour at 150° C. or for 15 hours at 50° C. The films passed the 1/8" bend test. The material cured at 150° C., had a rocker hardness of 18, a GL scratch value of 500 and a GL removal value of 2,000. The films cured at 150° C. showed no deterioration on immersion for 24 hours at 100° C. in toluene, methyl isobutyl ketone, dimethylformamide, mineral spirits, glacial acetic acid, 50% aqueous sulfuric acid, 10% aqueous sodium hydroxide and water.

*Example 7c.*—A mixture of 4.4 parts of the glycidyl ether of 7a and 2 parts of Versamid 115 were dissolved in xylene to give a nonvolatile content of 56% having a viscosity of Z. Films of 0.003" wet thickness were cured by heating for 1/2 hour at 150° C., for 2 hours at 50° C., or by standing at room temperature overnight. All of these films passed 1/8" bend tests. The material cured by heating for 2 hours at 50° C. gave a rocker hardness of 18, a GL scratch test of 600 and a GL removal test of 600. The material cured at 150° C. showed no deterioration on immersion for 24 hours at 100° C. in toluene, methyl isobutyl ketone, mineral spirits, water, 50% acqueous sulfuric acid, and 10% aqueous sodium hydroxide.

*Example 7d.*—A mixture of 7 parts of the glycidyl ether of Example 7b and 2 parts of Versamid 115 dissolved in xylene to give 35.5% nonvolatile content at a viscosity of H. Films of 0.003" wet thickness were cured by heating for 1/2 hour at 150° C., for 2 hours at 50° C., or at room temperature overnight. All of the cured films passed 1/8" bend test. The films cured at 150° C. show no deterioration on immersion for 24 hours at 100° C. in toluene, mineral spirits, methyl isobutyl ketone, glacial acetic acid, water, and 50% aqueous sulfuric acid.

*Example 7e.*—A mixture of 13 parts of the glycidyl ether of Example 7a, 12 parts of trimerized vegetable oil acid and .7 part of DMP30 dissolved in xylene to give a nonvolatile content of 54% had a viscosity of H. Films of 0.003" wet thickness baked for 1/2 hour at 175° C. passed a 1/8" bend test.

*Example 8b.*—A mixture of 8.5 parts of the glycidyl ether of Example 8a and .3 part of diethylene triamine were dissolved in xylene to give a nonvolatile content of 65% having a viscosity of V. Films of 0.003" wet thickness were cured to flexible infusible products by heating for .5 hour at 150° C., for 1 hour at 50° C., or on standing at room temperature overnight. All of these films passed a 1/8" bend test.

I claim:

1. A polyglycidyl ether formed by the reaction of a halohydrin selected from the group consisting of epichlorohydrin, epibromohydrin, glycerol dichlorohydrin and glycerol dibromohydrin with a hydroxyphenylated-phenyletherated material prepared by alkylating a phenol selected from the group consisting of monohydric and dihydric phenols having at least one of the ortho- and para-position carbon atoms unsubstituted on an aromatic nucleus to which a phenolic hydroxyl group is attached, with an unsaturated material selected from the group consisting of natural oils which are glycerol esters of unsaturated aliphatic acids having from about 12 to about 22 carbon atoms per molecule, synthetic esters of unsaturated aliphatic acids having from about 12 to about 22 carbon atoms per molecule with monohydric and polyhydric alcohols, phenolic esters of unsaturated, aliphatic acids having from about 12 to about 22 carbon atoms per molecule, and esters of unsaturated aliphatic alcohols containing from about 12 to about 22 carbon atoms per molecule with carboxylic acids, said material prior to reaction with said phenol having an average of at least two double bonds per molecule, said hydroxyphenylated componnd having a total phenol addition of at least 15% by weight, a phenol addition as hydroxyphenyl of at least about 10% by weight, said phenol additions being expressed in equivalents of phenol at unit weight 94, and an average of at least about 2 phenolic hydroxyls per molecule.

2. The polyglycidyl ether of claim 1 characterized by an average epoxide content of at least about 3 epoxide groups per molecule.

3. A process for preparing a polyglycidyl ether which comprises reacting a halohydrin selected from the group consisting of epichlorohydrin, epibromohydrin, glycerol dichlorohydrin and glycerol dibromohydrin with a hydroxyphenylated-phenyletherated material prepared by alkylating a phenol selected from the group consisting of monohydric and dihydric phenols having at least one of the ortho- and para-position carbon atoms unsubstituted on an aromatic nucleus to which a phenolic hydroxyl group is attached, with an unsaturated material selected from the group consisting of natural oils which are glycerol esters of unsaturated aliphatic acids having from about 12 to about 22 carbon atoms per molecule, synthetic esters of unsaturated aliphatic acids having from about 12 to about 22 carbon atoms per molecule with monohydric and polyhydric alcohols, phenolic esters of unsaturated, aliphatic acids having from about 12 to about 22 carbon atoms per molecule, and esters of unsaturated aliphatic alcohols containing from about 12 to about 22 carbon atoms per molecule with carboxylic acids, said material prior to reaction with said phenol having an average of at least two double bonds per molecule, said hydroxyphenylated compound having a total phenol addition of at least 15% by weight, a phenol addition as hydroxyphenyl of at least about 10% by weight, said phenol additions being expressed in equivalents of phenol at unit weight 94, and an average of at least about 2 phenolic hydroxyls per molecule.

4. The process of claim 3 wherein a stoichiometric excess of halohydrin is employed, based upon the phenolic hydroxyl content of the hydroxyphenylated-phenyletherated material.

5. The process of claim 3 wherein the final product is characterized by an average of at least about 3 epoxy groups per molecule.

6. A curable mixture which comprises an epoxide-converting agent and a polyglycidyl ether formed by reacting a halohydrin selected from the group consisting of epichlorohydrin, epibromohydrin, glycerol dichlorohydrin and glycerol dibromohydrin with a hydroxyphenylated-phenyletherated material prepared by alkylating a phenol selected from the group consisting of monohydric and dihydric phenols having at least one of the ortho- and para-position carbon atoms unsubstituted on an aromatic nucleus to which a phenolic hydroxyl group is attached, with an unsaturated material selected from the group consisting of natural oils which are glycerol esters of unsaturated aliphatic acids having from about 12 to about 22 carbon atoms per molecule, synthetic esters of unsaturated aliphatic acids having from about 12 to about 22 carbon atoms per molecule with monohydric and polyhydric alcohols, phenolic esters of unsaturated aliphatic acids having from about 12 to about 22 carbon atoms per molecule, and esters of unsaturated aliphatic alcohols containing from about 12 to about 22 carbon atoms per molecule with carboxylic acids, said material prior to reaction with said phenol having an average of at least two double bonds per molecule, said hydroxyphenylated compound having a total phenol addition of at least 15% by weight, a phenol addition as hydroxyphenyl of at least about 10% by weight, said phenol additions being expressed in equivalents of phenol at unit weight 94, and an average of at least about 2 phenolic hydroxyls per molecule.

7. The curable mixture of claim 6 wherein the converting agent is the reaction product of a polyalkylene polyamine and a dimerized vegetable oil acid.

8. The curable mixture of claim 6 also containing hydrocarbon materials selected from the group consisting of coal tars and asphalts and mixtures thereof, said mixture containing from about 5 to about 95% based on the total weight of the mixture of said hydrocarbon material.

9. The mixture of claim 8 containing from about 10 to about 90% of said hydrocarbon material.

10. The curable mixture of claim 6, wherein the converting agent is a hydroxyphenylated-phenyletherated material selected from the group consisting of unsaturated petroleum resins, unsaturated polymers of butadiene and its homologues, unsaturated copolymers of butadiene and its homologues with vinylly unsaturated monomers, natural oils which are glycerol esters of unsaturated aliphatic acids having from about 12 to about 22 carbon atoms per molecule, synthetic esters of unsaturated aliphatic acids having from about 12 to about 22 carbon atoms per molecule with monohydric and dihydric alcohols, phenolic esters of unsaturated aliphatic acids having from about 12 to about 22 carbon atoms per molecule, unsaturated aliphatic alcohols having from about 12 to about 22 carbon atoms per molecule, and esters of unsaturated alcohols having from about 12 to about 22 carbon atoms per molecule with carboxylic acids.

11. The curable mixture of claim 10 also containing hydrocarbon materials selected from the group consisting of coal tars and asphalts and mixtures thereof, said mixture containing from about 5 to about 95% based on the total weight of the mixture of said hydrocarbon material.

12. The mixture of claim 11 containing from about 10 to about 90% of said hydrocarbon material.

13. A cured resinous material which comprises the reaction product of an epoxide-converting agent and a polyglycidyl ether formed by reacting a halohydrin selected from the group consisting of epichlorohydrin, epibromohydrin, gylcerol dichlorohydrin and glycerol dibromohydrin with a hydroxyphenylated-phenyletherated material prepared by alkylating a phenol selected from the group consisting of monohydric and dihydric phenols having at least one of the ortho- and para-position carbon atoms unsubstituted on an aromatic nucleus to which a phenolic hydroxyl group is attached, with an unsaturated material selected from the group consisting of natural oils which are glycerol esters of unsaturated aliphatic acids having from about 12 to about 22 carbon atoms per molecule, synthetic esters of unsaturated aliphatic acids having from about 12 to about 22 carbon atoms per molecule with monohydric and polyhydric alcohols, phenolic esters of unsaturated aliphatic acids having from about 12 to about 22 carbon atoms per molecule, and esters of unsaturated aliphatic alcohols containing from about 12 to about 22 carbon atoms per molecule with carboxylic acids, said material prior to reaction with said phenol having an average of at least two double bonds per molecule, said hydroxyphenylated compound having a total phenol addition of at least 15% by weight, a phenol addition as hydroxyphenyl of at least about 10% by weight, said phenol additions being expressed in equivalents of phenol at unit weight 94, and an average of at least about 2 phenolic hydroxyls per molecule.

14. The composition of claim 13 wherein the converting agent is the reaction product of a polyalkylene polyamine and a dimerized vegetable oil acid.

15. The product of claim 13 also containing hydrocarbon materials selected from the group consisting of coal tars and asphalts and mixtures thereof, said mixture containing from about 5 to about 95% based on the total weight of the mixture of said hydrocarbon material.

16. The product of claim 15 containing from about 10 to about 90% of said hydrocarbon material.

17. The product of claim 13 wherein the converting agent is a hydroxyphenylated-phenyletherated material selected from the group consisting of unsaturated petroleum resins, unsaturated polymers of butadiene and its homologues, unsaturated copolymers of butadiene and its homologues with vinylly unsaturated monomers, natural oils which are glycerol esters of unsaturated aliphatic acids having from about 12 to about 22 carbon atoms per molecule, synthetic esters of unsaturated aliphatic acids having from about 12 to about 22 carbon atoms per molecule with monohydric and dihydric alcohols, phenolic esters of unsaturated aliphatic acids having from about 12 to about 22 carbon atoms per molecule, unsaturated aliphatic alcohols having from about 12 to about 22 carbon atoms per molecule, and esters of unsaturated alcohols having from about 12 to about 22 carbon atoms per molecule with carboxylic acids.

18. The product of claim 17 also containing hydrocarbon materials selected from the group consisting of coal tars and asphalts and mixtures thereof, said mixture containing from about 5 to about 95% based on the total weight of the mixture of said hydrocarbon material.

19. The product of claim 18 containing from about 10 to about 90% of said hydrocarbon material.

No references cited.